United States Patent
Ishii et al.

(10) Patent No.: US 6,731,436 B2
(45) Date of Patent: May 4, 2004

(54) DISPLAY APPARATUS FOR A VEHICLE

(75) Inventors: Koji Ishii, Shizuoka (JP); Masayuki Ogawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/327,895

(22) Filed: Dec. 26, 2002

(65) Prior Publication Data

US 2003/0128436 A1 Jul. 10, 2003

(30) Foreign Application Priority Data

Dec. 28, 2001 (JP) .................... 2001-400274

(51) Int. Cl.[7] ................ G02B 27/14; H04N 7/00; H04N 7/18; H04N 9/47
(52) U.S. Cl. .................... 359/630; 348/115
(58) Field of Search ................ 359/630–632, 359/726; 353/28; 348/115, 116, 119; 345/7

(56) References Cited

U.S. PATENT DOCUMENTS 5,530,420 A * 6/1996 Tsuchiya et al. ............ 348/116
6,262,848 B1 * 7/2001 Anderson et al. ............ 359/630
6,327,522 B1 * 12/2001 Kojima et al. .............. 348/115
2003/0112132 A1 * 6/2003 Trajkovic et al. ........... 340/435

* cited by examiner

*Primary Examiner*—Georgia Epps
*Assistant Examiner*—Alicia M. Harrington
(74) *Attorney, Agent, or Firm*—Armstrong, Kratz, Quintos, Hanson & Brooks, LLP

(57) ABSTRACT

For displaying a virtual image without hindering from seeing a front view, a display apparatus for a vehicle includes a storage device $21b$ for storing a distance information of superimposed viewing, the distance information indicating a distance between an obstacle in the view ahead a vehicle and the vehicle when the obstacle and, a virtual image of a picture projected on a windshield are viewed as a superimposed front view; distance measuring means 40 for measuring a distance between the vehicle and the obstacle; judging means $21a1$ for judging whether or not the virtual image is superimposed on the obstacle; and control means $21a2$ for stopping the projection of the virtual image when it is judged that the virtual image is superimposed on the obstacle.

3 Claims, 4 Drawing Sheets

DISPLAY APPARATUS FOR A VEHICLE

BACKGROUND OF THE INVENTION

1. Field of the Invention

This invention relates to a display apparatus for a vehicle, projecting a picture displayed on an image source onto the member of projection in front of a vehicle driver for superimposing a virtual image of the picture on a front view looked through a windshield from an eye point within the vehicle.

2. Description of the Related Art

A projection display apparatus, called a head up display (HUD), is applied to display information, which can not be displayed on an instrument panel because of no extra rooms for increasing contents and variety of information requested by a vehicle driver at driving these years, as a virtual image on a windshield by superimposing the virtual image on a front view looked through the windshield.

It is known that major information, which a human receives from outside, is by visual sense so that importance of visibility is extremely increased when driving a vehicle. Faster perceiving an obstacle existing in a travelling direction, more marginally a vehicle driver can take action therefor. For the reason, a night vision system for driving at night to support safe driving by insuring visibility at night or in a bad visual condition is on the market.

The night vision system is structured with an infrared camera mounted on a front portion of a vehicle, a computer and the HUD mentioned above. Displaying a monochrome virtual image, detected by the infrared camera to detect infrared rays radiated by an object, with the HUD in front of a vehicle driver, makes the vehicle driver perceive an invisible obstacle in the dark or an obstacle ahead the vehicle in a bad visual condition by rain or fog.

OBJECTS TO BE SOLVED

Reflecting image light ray of the HUD at a member of projection such as a combiner or a windshield, the HUD makes the vehicle driver perceive the image in driving view area. Thereby, an angle moving a visual axis downwardly to see an image can be decreased as compared with seeing meters or a usual image so that a time for moving a visual axis can be shortened. Thereby, position of display can be in the distance from a vehicle driver so that focusing eyes can be made easy when moving a visual axis from a front view to the image. When a distance between a vehicle going ahead is small or a distance between an obstacle such as a human, an animal or the like is small, displaying an image hides a front view so that a vehicle driver may be hindered from seeing the front view.

To overcome the above drawback of a usual display system, one object of this invention is to provide a display apparatus for a vehicle which can display a virtual image without hindering from seeing a front view.

SUMMARY OF THE INVENTION

How to Attain the Object

In order to attain the objects, a display apparatus for a vehicle according to this invention, as shown in a basic block diagram of FIG. 1, wherein projecting a picture displayed on an image source onto a member of projection in front of a vehicle driver for superimposing a virtual image of the picture on a front view looked through a windshield from an eye point within the vehicle, includes a storage device 21$b$ for storing a distance information of superimposed viewing, the distance information of superimposed viewing indicating a distance between an obstacle existing in the view ahead the vehicle and the vehicle whereby the virtual image and the obstacle are viewed as a superimposed front view from the eye point; distance measuring means 40 for measuring a distance between the vehicle and the obstacle; judging means 21$a$1 for judging whether or not the virtual image is superimposed on the obstacle based on the distance measured by the distance measuring means 40 and the distance information of superimposed viewing stored in the storage device 21$b$; and control means 21$a$2 for controlling to stop the projection of the picture when the judging means 21$a$1 judges that the virtual image is superimposed on the obstacle.

In the display apparatus for a vehicle as mentioned above, a distance information of superimposed viewing indicating a distance between an obstacle in the view ahead the vehicle and the vehicle, in which the virtual image and the obstacle are viewed as a superimposed front view from an eye point, is stored in the storage device 21$b$. When a distance between the vehicle and the obstacle is measured by the distance measuring means 40, it is judged by the judging means 21$a$1 whether or not the virtual image is superimposed on the obstacle based on the distance measured by the distance measuring means 40 and the distance information of superimposed viewing stored in the storage device 21$b$. Controlling to stop the projection of the picture onto a member of projection is done by control means 21$a$2 when it is judged that the virtual image is superimposed on the obstacle. Thus, when an obstacle which is seen in a front view and superimposed by the virtual image in the view from the eye point is detected, projecting a picture onto the member of projection is stopped so that a display apparatus for a vehicle, which does not fail to perform essential purpose of the display apparatus for awaking speedily visual information in driving without preventing from superimposing a virtual image on an obstacle from an eye point, can be provided.

The display apparatus according to this invention, as shown in the basic block diagram of FIG. 1, further includes detecting means 32 for detecting a display position information indicating a display position of a virtual image from the eye point and the storage device 21$b$ for storing a distance information of superimposed viewing stores the distance information of superimposed viewing correspondingly to the display position information, and the judging means 21$a$1 judges based on the distance information of superimposed viewing read out from the storage device 21$b$ correspondingly to the display position information detected by the detecting means 32 for detecting a display position information, in the display apparatus as mentioned above.

In the display apparatus for a vehicle as mentioned above, when a display position information indicating a display position of a virtual image from an eye point is detected by the detecting means 32, the distance information of superimposed viewing corresponding to the display position information is read out from the storage device 21$b$ and whether or not the virtual image is superimposed on the obstacle is judged by the judging means 21$a$1, based on the distance information of superimposed viewing. Thus, a display position information indicating a display position of a virtual image from an eye point is detected and projecting a picture onto the member of projection is stopped when an obstacle which is seen in a front view and is superimposed by the virtual image in the view from the eye point is detected based on the distance information of superimposed viewing corresponding to the display position information, so that superimposing a virtual image on an obstacle from an eye point is prevented even if a position of the eye point is moved. Therefore, a display apparatus for a vehicle without hindering from seeing a front view by superimposing a virtual image can be provided, even if a position of an eye point is changed by replacing the other driver with a different physique to move a driver seat forward/backward or have a different sitting height.

The display apparatus according to this invention, as shown in the basic block diagram of FIG. 1, further includes detecting means 50 for detecting an information of external condition to judge whether or not it is bright at the outside of the vehicle, and the image source displays an image of the infrared camera which can take the image ahead the vehicle at night, and the judging means 21a1 judges whether or not it is bright at the outside of the vehicle based on the information of the external condition detected by the detecting means 50, and the control means 21a2 controls to stop the projection of the picture when it is judged by the judging means 21a1 that it is bright at the outside of the vehicle, in the display apparatus as mentioned above.

In the display apparatus for a vehicle as mentioned above, the judging means 21a1 judges whether or not it is bright at the outside of the vehicle based on the information of the external condition detected by the detecting means 50, and the control means 21a2 controls to stop projecting a picture taken by the infrared camera onto the member of projection when it is judged by the judging means 21a1 that it is bright at the outside of the vehicle. When the display apparatus for a vehicle according to this invention is applied to a night vision system for driving at night, light of a streetlight with large brightness or a headlight of an oncoming vehicle may cover a virtual image so that a vehicle driver can not perceive an obstacle easily. However, in the display apparatus mentioned above, judging whether or not it is bright at the outside of the vehicle based on the information of the external condition and controlling to stop projecting a picture onto the member of projection when it is judged that it is bright at the outside of the vehicle, hindering from perceiving an obstacle by a virtual image can be prevented. Therefore, a vehicle driver can perceive an obstacle securely and driving visibility at night can be supported securely.

The above and other objects and features of this invention will become more apparent from the following description taken in conjunction with the accompanying drawings.

BRIEF DESCRIPTION OF THE DRAWINGS

FIG. 2 is a block diagram, showing a principal structure of a night vision system for driving at night which a display apparatus for a vehicle according to this invention is applied to;

DESCRIPTION OF THE PREFERRED EMBODIMENT

An embodiment of a night vision system for driving at night (night vision) in which a display apparatus for a vehicle according to this invention is applied will be described with reference to FIGS. 2–9.

Figure 1:
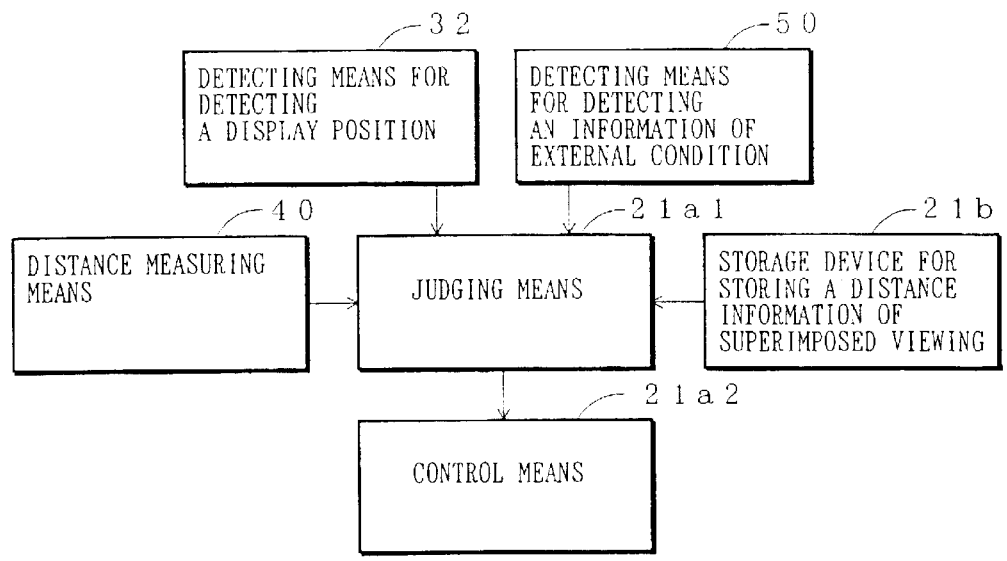
FIG. 1 is a basic block diagram of a display apparatus for a vehicle according to this invention.
Figure 2:
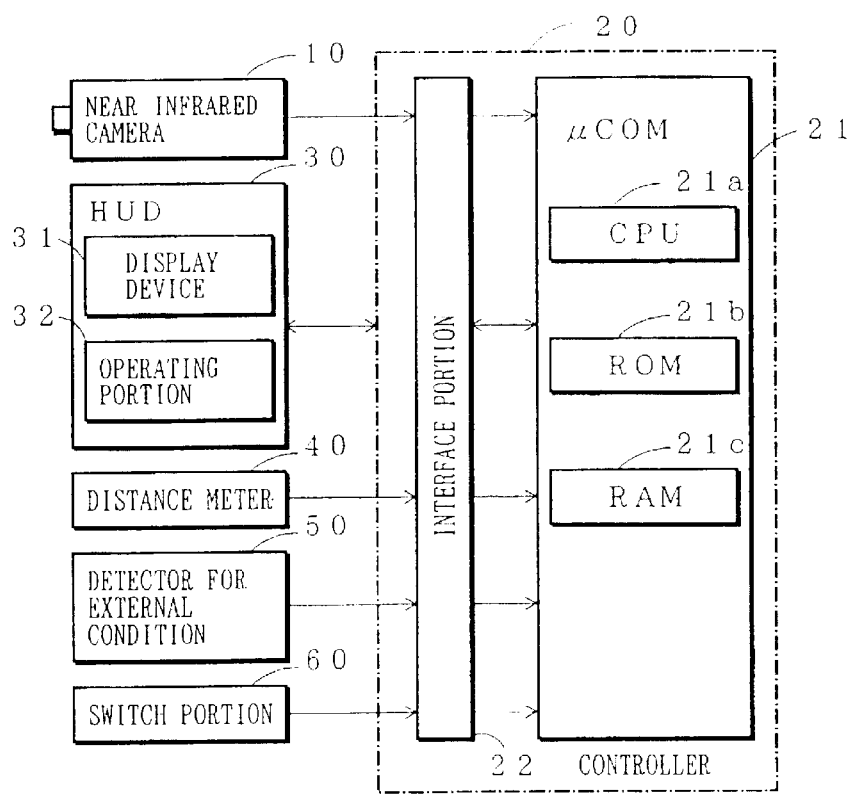
Figure 3:
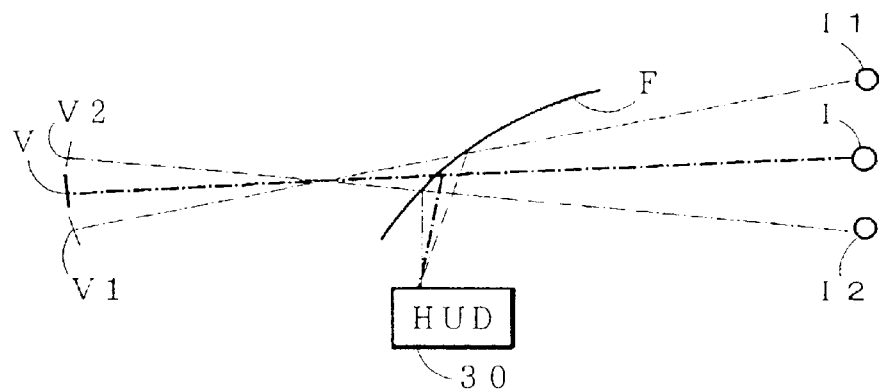
FIG. 3 is an explanation drawing, showing a display position of a virtual image corresponding to an eye point.
Figure 4:
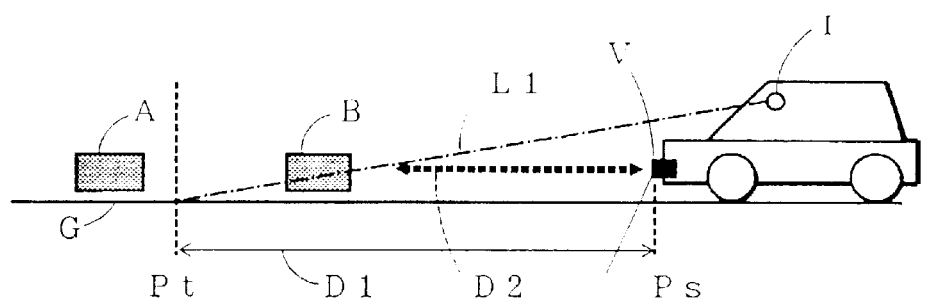
FIG. 4 is an explanation drawing, showing a distance information of superimposed viewing.
Figure 5:
FIG. 5 is an expanded view of an area from the eye point to the virtual image in FIG. 4.
Figure 6:
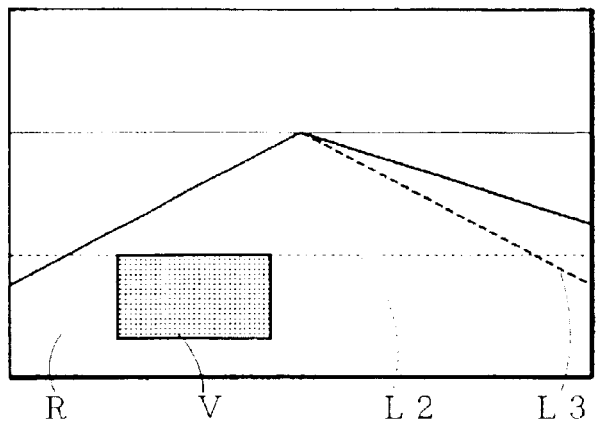
FIG. 6 is a first example of a view from the eye point.
Figure 7:
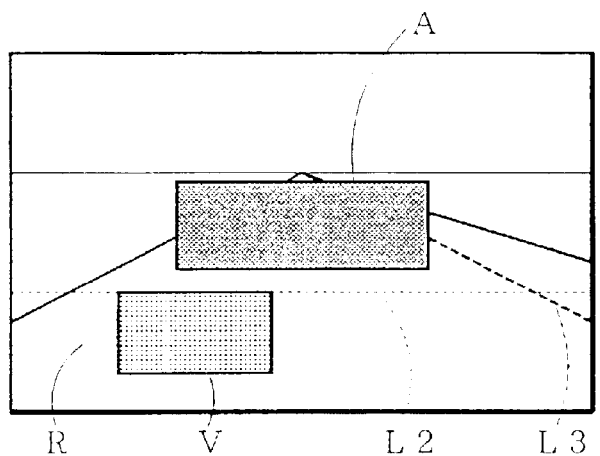
FIG. 7 is a second example of a view from the eye point.
Figure 8:
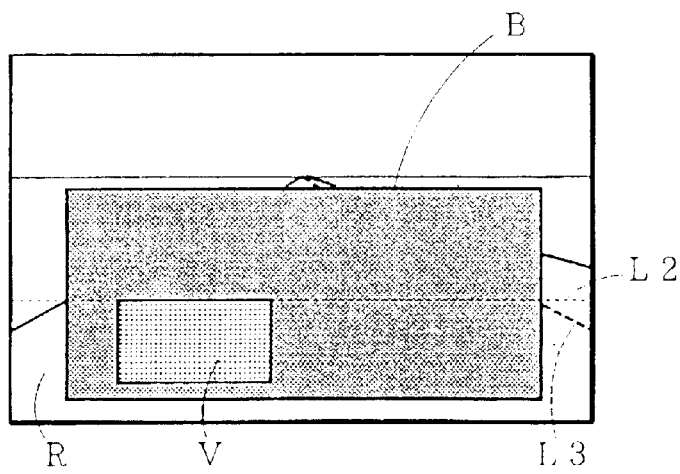
FIG. 8 is a third example of a view from the eye point.
Figure 9:
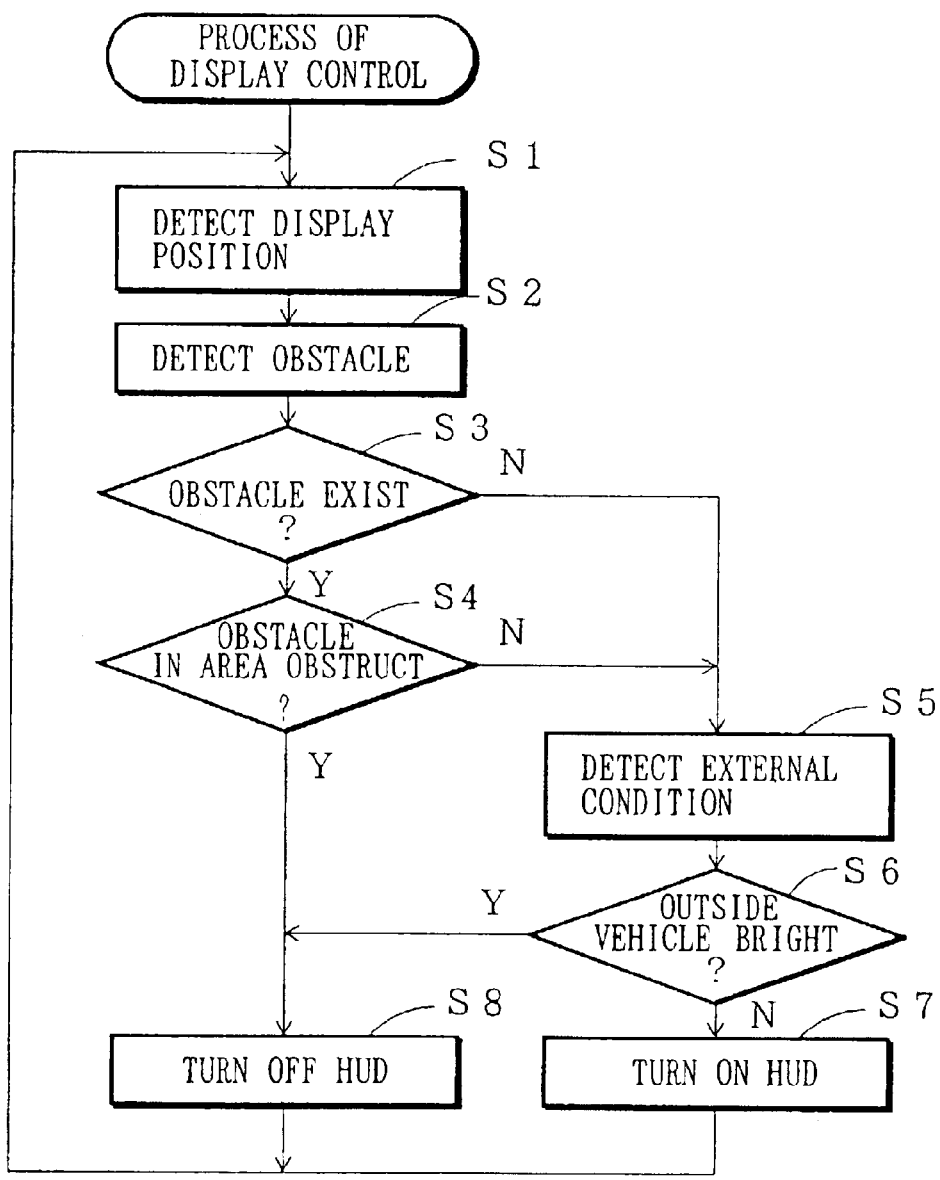
FIG. 9 is a flow chart, showing an example of process of display control executed by a CPU in a controller.

FIG. 2 is a block diagram, showing a principal structure of a night vision system for driving at night which a display apparatus for a vehicle according to this invention is applied to. FIG. 3 is an explanation drawing, showing a display position of a virtual image corresponding to an eye point. FIG. 4 is an explanation drawing, showing a distance information of superimposed viewing. FIG. 5 is an expanded view of an area from the eye point to the virtual image in FIG. 4. FIG. 6 is a first example of a view from the eye point. FIG. 7 is a second example of a view from the eye point. FIG. 8 is a third example of a view from the eye point. FIG. 9 is a flow chart, showing an example of process of display control executed by a CPU in a controller.

The night vision system for driving at night (night vision) installed in a vehicle, applied by a display apparatus for a vehicle according to this invention, includes a near infrared camera 10, a controller 20, a head up display (HUD) 30, a distance meter 40, a detector for external condition 50 and a switch portion 60.

The near infrared camera 10 is a well-know camera which can take the image within range of near infrared ray and can take the image an object brightly without dazzling a pedestrian or a vehicle driver of an oncoming vehicle by projecting infrared light as auxiliary light ahead the vehicle. Whenever the near infrared camera 10 takes an image of a front view, the near infrared camera 10 outputs an information of picture of the view to an image-adjusting device for a vehicle 20. Thus, using a near infrared camera 10 instead of an expensive far infrared camera, cost-reduction of a night vision system for driving at night is striven. In this embodiment, an example by using a near infrared camera 10 as an infrared camera is explained, but a night vision system for driving at night can also use a far infrared camera.

The controller 20 has a microcomputer 21 (iCOM) to operate by a predetermined program. The iCOM 21 generally includes a central processing unit 21a (CPU) for processing or controlling by a predetermined program, a ROM 21b as a read-only memory for storing a program or the like for the CPU 21a and a RAM 21c as a read-write memory for storing various data and having a memory area required for operation of the CPU 21a.

Furthermore, the controller 20 has an interface portion 22 connecting with the iCOM 21 and the interface portion 22 is connected with the near infrared camera 10, the HUD 30, the distance meter 40, the detector for external condition 50 and the switch portion 60. The controller 20 outputs an information of picture inputted from the near infrared camera 10 thereto toward a display device 31 in the HUD 30 to display the picture at the HUD 30. Various data from the HDU 30, the distance meter 40, the detector for external condition 50 and a switch portion 60 are inputted through the interface portion 22 into the iCOM 21.

The HUD 30, as shown in FIG. 3, is a device to project the picture of the near infrared camera 10, imaging ahead the vehicle, on a projection area of the windshield F for superimposing a virtual image V of the picture on a front view, looked through the windshield F from an eye point I within the vehicle.

The HUD 30 includes the display device 31, such as a field emission (FE) display, a fluorescent lamp display, an electroluminescent (EL) display and a liquid crystal display with a back-light, and an operating portion 32 for adjusting a display position of the virtual image V.

The display device 30 mounted in a dash-board projects a picture outputted by the iCOM 21 on the projection area of the windshield F. Projecting a picture onto a combiner can be applied instead of projecting the picture directly onto the windshield F.

The operating portion 32 has an adjusting portion for adjusting a display position of a virtual image correspondingly to an eye point I to adjust a projection angle of the display device 31 against a different eye point I by replacing the other driver with a different physique to move a driver seat forward/backward or have a different sitting height.

In this embodiment, the operating portion 32 can adjust the eye point I within range between an eye point I1 of an upper limit and an eye point I2 of a lower limit. A vehicle driver can operate the operating portion 32 to set a display position V1 of a virtual image corresponding to the eye point I1 of the upper limit or a display position V2 of a virtual image corresponding to the eye point I2 of the lower limit.

The display position of the virtual image can be detected by an adjusted value, such as a rotation angle of a mirror or a rotation angle of the adjusting portion, and the operating portion 32 outputs a display position information indicating the adjusted value toward the iCOM 21. Thus, in this embodiment, the operating portion 32 performs as the detecting means 32 for detecting a display position information described in this invention.

The distance meter 40 corresponds to the distance measuring means 40 for measuring a distance between the vehicle and the obstacle and is provided with a detector for an obstacle, such as a well-known charged coupled device (CCD) camera, a laser radar or a millimeter-wave radar. The distance meter 40 may be installed in a radiator grille of a vehicle as shown in FIG. 4, and measures a distance to an obstacle ahead the vehicle and outputs the measured value as the distance information toward the iCOM 21.

The detector for external condition 50 corresponds to the detecting means 50 for detecting an information of external condition to judge whether or not it is bright at the outside of the vehicle and is provided with a well-known illuminance sensor. The detector for external condition 50 outputs a measured value by measuring the external condition of the vehicle by the illuminance sensor as an information of external condition toward the iCOM 21. The iCOM 21 judges whether or not it is bright at the outside of the vehicle, based on the information of the external condition.

The embodiment in which an illuminance sensor detector is applied in the detector for external condition 50 will be described. It is not restricted, for example, the near infrared camera can perform as the detecting means 50 for detecting an information of external condition when detecting external brightness by a picture of the near infrared camera.

When a navigation system is installed in a vehicle, outputting a position information, detected by a global positioning system (GPS) receiver provided in the navigation system, as an information of external condition toward the iCOM 21, the iCOM 21 may judge whether or not it is bright at the outside of the vehicle, based on the position by the position information.

The switch portion 60 has switches and buttons for operating manually start and stop to display in the HUD 30, and may be mounted in a steering wheel of a vehicle and be pushed manually by a driver to be turned ON or OFF. A condition information to inform ON or OFF condition of the operating portion 32 is outputted toward the iCOM 21.

The ROM 21b of the controller 20 performs as the storage device 21b for storing a distance information of superimposed viewing, the distance information of superimposed viewing indicating a distance between an obstacle in the view ahead the vehicle and the vehicle, in which the virtual image and the obstacle are viewed as a superimposed front view from an eye point. In this embodiment, as shown in FIGS. 4 and 5, a distance D1 is defined between an intersection point Pt of a line L1, made with the eye point I and the top point Pv of the virtual image and a ground line G, and a position Ps corresponding to a front end of the vehicle on the ground line.

When a driver looks ahead the vehicle from the eye point I, a roadway R for driving the vehicle can be seen in a front view through a windshield F and a virtual image is displayed lower left in the view, as shown in FIG. 6. The intersection point Pt is on a dotted line L2 (virtual line) extending right and left from a top edge of the virtual image V. L3 is the centerline of the roadway R.

When an obstacle A exists ahead the intersection point Pt, the virtual image is not superimposed on the obstacle A as shown in FIG. 7. When an obstacle B exists at a distance D2 (D1>D2) from the vehicle close to the vehicle from the intersection point Pt as shown in FIG. 4, the virtual image is superimposed on the obstacle B in the view from the eye point I as shown in FIG. 8. Therefore, in this embodiment, the distance D1 is defined as a threshold value of superimposing and is used for a distance information of superimposed viewing.

In the HUD 30, as mentioned above, the display position can be adjusted within range between the virtual images V1 and V2. Therefore, The dimensions D1 corresponding to one or more display positions in the adjustable range are defined as threshold values and respective threshold values are stored correspondingly to display positions of the virtual images V1–V2.

Furthermore, the ROM 21b stores a program of process for display control for the iCOM 21 performing as judging means for judging whether or not the virtual image is superimposed on the obstacle based on a distance measured by the distance meter (distance measuring means) 40 and a distance information of superimposed viewing stored in the ROM (storage device for storing a distance information of superimposed viewing) 21b, and as control means for controlling to stop the projection of the picture when the judging means judges that the virtual image is superimposed on the obstacle, in a night vision system for driving at night for supporting driving visibility at night to project the picture by a near infrared camera, imaging ahead the vehicle, on a member of projection in front of the vehicle driver for superimposing a virtual image of the picture on a front view through the windshield F from an eye point I within the vehicle.

An example of process of display control operated by the CPU 21a of the controller 20 in the night vision system for driving at night will be described with reference to a flowchart of FIG. 9.

When starting display is requested by operation of the switch portion 60 by a vehicle driver, the process of display control shown in FIG. 9 is executed. In Step S1, a display position information detected in the operating portion 32 of the HUD 30 is inputted into the RAM 21c. Thereafter, in Step S2, a distance information measured by the distance meter 40 for detecting an obstacle is inputted into the RAM 21c, and the process goes to Step S3.

In Step S3, it is judged whether or not an obstacle exists ahead the vehicle based on the distance information in the RAM 21c. When it is judged that no obstacle exists (N in Step S3) the process goes to Step S5. When it is judged that an obstacle exists (Y in Step S3), the process goes to Step S4.

In Step S4, outputting a threshold value corresponding to a display position information from the distance information of superimposed viewing in the ROM 21*b* and judging whether or not the distance by the distance information is larger than the threshold value, it is judged whether or not the obstacle exist in a area where a roadway is obstructed thereby. When the measured distance is larger than the threshold value (D1), in other words, it is judged that no obstacle exists in the area (N in Step S4), the process goes to Step 55.

In Step S5, an information of external condition detected by the detector for external condition 50 is inputted into the RAM 21*c*. Thereafter, in Step S6, it is judged whether or not it is bright at the outside of the vehicle based on the information of the external condition in the RAM 21*c*. When it is judged that it is bright at the outside of the vehicle (Y in Step S6), the process goes to Step S8. When it is not bright (N in Step S6), the process goes to Step 57.

In Step S7, request of turning the HUD 30 ON, in other words, starting request to start projection is outputted to the display device 31 of the HUD 30. Thereafter, the process returns to Step S1. Thus, a flow of process is repeated. By the process, the display device 31 of the HUD 30 starts to project a picture of the near infrared camera 10 on the windshield F and the virtual image V is displayed.

On the other hand, when the measured distance is smaller than the threshold value (D1), in other words, it is judged that an obstacle exists in the area (N in Step S4) in Step S4, request of turning the HUD 30 OFF, in other words, stopping request to stop projection is outputted to the display device 31 of the HUD 30, in Step S8. Thereafter, the process returns to Step S1. Thus, a flow of process is repeated. By the process, the display device 31 of the HUD 30 stops projecting a picture of the near infrared camera 10 onto the windshield F and the virtual image V is not displayed.

As mentioned above, Step S4 and S6 performs as the judging means, and Step 8 performs as the control means. Therefore, the CPU 21*a*1 of the iCOM 21 performs as the judging means and the control means described in the scope of this invention.

An example of actions of the night vision system for driving at night having the above structure will be described herein.

When the night vision system for driving at night is started by means of operating the switch portion 60 by a driver, a picture ahead the vehicle by the near infrared camera 10 is projected on the windshield F by the HUD 30, and the projected picture can be seen as a virtual image V in the view from the eye point I (see FIG. 6). Existence of an obstacle in the view ahead the vehicle and superimposed on by the virtual image V in the view from the eye point, is detected based on the display position of the virtual image in the view from the eye point I being detected by the operating portion 32 of the HUD 30 and the distance from the vehicle to the obstacle measured by the distance meter 40.

When an obstacle A exists ahead the intersection point Pt as shown in FIG. 4, a picture is projected by the HUD 30 and the virtual image V of the picture is displayed. When an obstacle B is detected close to the vehicle from the intersection point Pt as shown in FIG. 4, projecting a picture onto the windshield F by the HUD 30 is stopped, and displaying the virtual image V of the picture is stopped. Thereafter, when no obstacle existing close to the vehicle from the intersection point Pt is detected and it is not bright at outside of the vehicle, projecting a picture onto the windshield F by the HUD 30 is started again, and the virtual image V of the picture is displayed.

When no obstacle exists close to the vehicle from the intersection point Pt and the detector for external condition 50 detects change of the external condition of the vehicle to have a lot of streetlights at a shopping street, projecting a picture onto the windshield F by the HUD 30 is stopped and displaying the virtual image V of the picture is stopped. Thereafter, when the detector for external condition 50 detects change of the external condition of the vehicle to be dark, projecting a picture onto the windshield F by the HUD 30 is started again, and the virtual image V of the picture is displayed.

When an obstacle in the view ahead the vehicle superimposed by the virtual image in the view from the eye point I is detected, projecting a picture onto the windshield F (member of projection) is stopped. Therefore, superimposing a virtual image V on the obstacle seen from the eye point I is prevented. A night vision system for driving at night for supporting driving visibility at night, which does not fail to perform essential purpose of the display apparatus for awaking speedily an obstacle far ahead the vehicle without hindering from seeing the front view by displaying a virtual image, can be provided.

When an obstacle superimposed by the virtual image V in the view from the eye point is detected based on a distance information of superimposed viewing corresponding to a display position information indicating the display position of the virtual image V in the view from the eye point I which is detected by the operating portion 32 of the HUD 30, projecting a picture onto the windshield F is stopped. Thereby, superimposing a virtual image on an obstacle can be prevented even if a position of the eye point I is moved. Therefore, a night vision system for driving at night for supporting driving visibility without hindering from seeing a front view by superimposing a virtual image can be provided, even if a position of an eye point is changed by replacing the other driver with a different physique to move a driver seat forward/backward or have a different sitting height.

Light of a streetlight with large brightness or a headlight of an oncoming vehicle may cover a virtual image so that a vehicle driver can not perceive an obstacle easily. However, judging whether or not it is bright at the outside of the vehicle based on the information of the external condition detected by the detector for external condition 50 and controlling to stop projecting a picture onto the windshield F (member of projection) when it is judged that it is bright at the outside of the vehicle, it can be prevented that a virtual image hinders from perceiving an obstacle. Therefore, a vehicle driver can perceive an obstacle securely and driving visibility at night can be supported more securely.

In the embodiment as mentioned above, a night vision system for driving at night, to which a display apparatus for a vehicle according to this invention is applied, is described. This invention is not restricted thereto, and a display apparatus for a vehicle according to this invention can be applied to a display apparatus for projecting visual information for driving, like necessary auxiliary information for driving such as information of going ahead by a navigation system or a travelling speed, as an image by the HUD 30 of an image source. For such apparatus, a navigation system or a speed meter may be used instead of the near infrared camera 10 in the display apparatus as structured above.

In the embodiment as mentioned above, a display apparatus for a vehicle in which a windshield F is used as the member of projection is described. This invention is not restricted thereto, and a combiner can be used as the member of projection.

While the forms of the invention herein disclosed constitute presently preferred embodiments, many others are possible. It is not intended herein to mention all the possible embodiments of the invention which will be apparent to those skilled in the art. It is understood that the term used herein are merely descriptive rather than limiting, in that various changes may be made without departing from the scope of this invention as defined by the following claims.

What is claimed is:

1. A display apparatus for a vehicle, wherein projecting a picture displayed on an image source onto a member of projection in front of a vehicle driver for superimposing a virtual image of said picture on a front view looked through a windshield from an eye point within the vehicle, comprising:

a storage device for storing a distance information of superimposed viewing, the distance information of superimposed viewing indicating a distance between an obstacle existing in the view ahead the vehicle and the vehicle whereby the virtual image and the obstacle are viewed as a superimposed front view from the eye point;

distance measuring means for measuring a distance between the vehicle and the obstacle;

judging means for judging whether or not the virtual image is superimposed on the obstacle based on the distance measured by the distance measuring means and the distance information of superimposed viewing stored in the storage device; and control means for controlling to stop the projection of the picture when the judging means judges that the virtual image is superimposed on the obstacle.

2. The display apparatus for a vehicle according to claim 1, further comprising detecting means for detecting a display position information indicating a display position of a virtual image from the eye point, wherein the storage device for storing a distance information of superimposed viewing stores the distance information of superimposed viewing correspondingly to the display position information, wherein the judging means judges based on the distance information of superimposed viewing read from the storage device correspondingly to the display position information detected by the detecting means for detecting a display position information.

3. The display apparatus according to claim 1 or 2, further comprising detecting means for detecting an information of external condition to judge whether or not it is bright at the outside of the vehicle, wherein the image source displays an image of an infrared camera which can take the image ahead the vehicle at night, wherein the judging means judges whether or not it is bright at the outside of the vehicle based on the information of the external condition detected by the detecting means, wherein the control means controls to stop the projection of the picture when it is judged by the judging means that it is bright at the outside of the vehicle.

* * * * *